Figure 1:
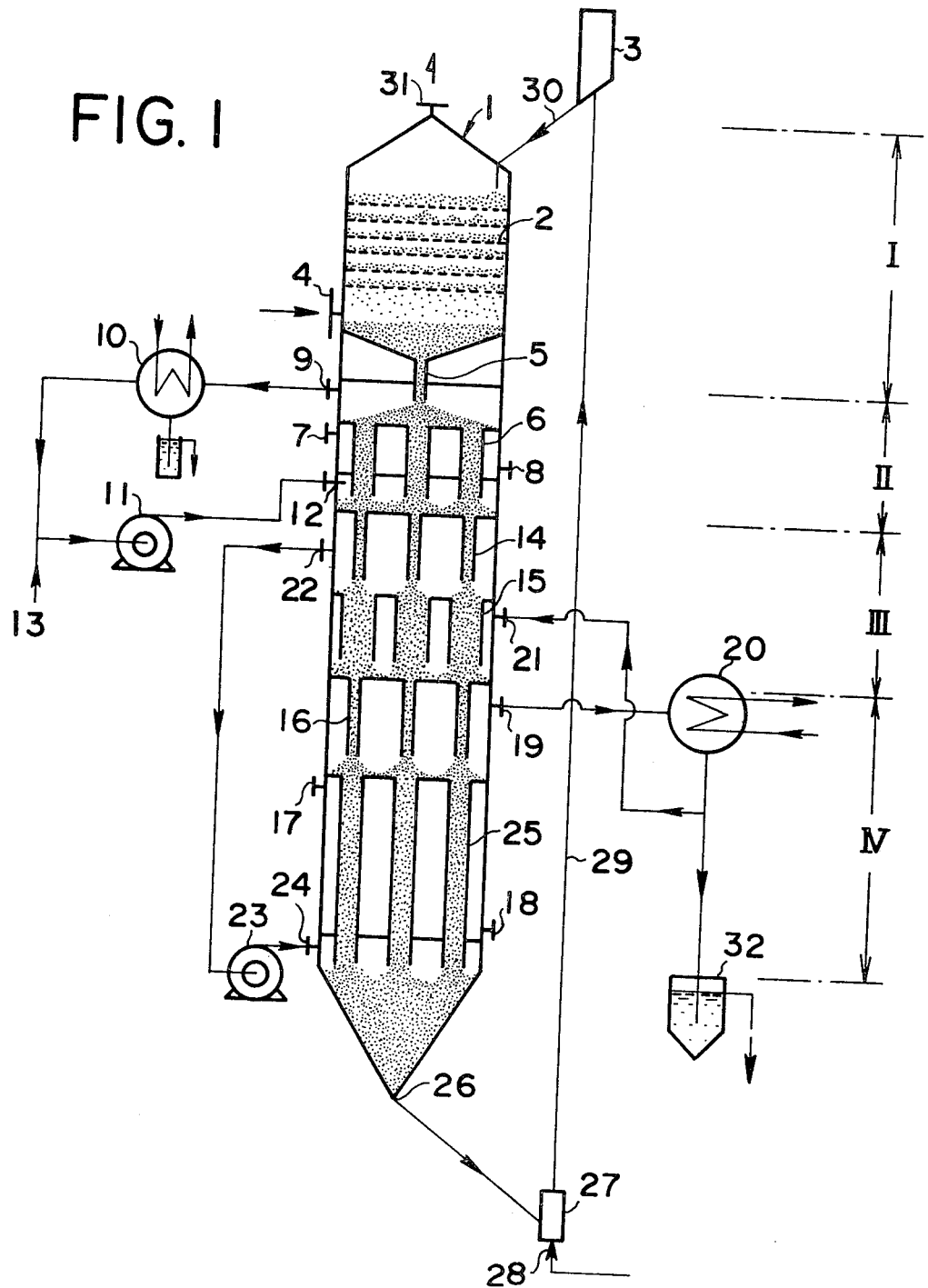

United States Patent [19]

Nagai et al.

[11] 4,259,094
[45] Mar. 31, 1981

[54] APPARATUS FOR CONTINUOUS RECOVERY OF SOLVENT

[75] Inventors: Hiroshi Nagai, Chofu; Tsuneo Okamoto, Tokyo, both of Japan

[73] Assignee: Kureha Kagaku Kogyo Kabushiki Kaisha, Tokyo, Japan

[21] Appl. No.: 32,690

[22] Filed: Apr. 23, 1979

[30] Foreign Application Priority Data

May 2, 1978 [JP] Japan .................................. 53-53175

[51] Int. Cl.³ .......................................... B01D 53/08
[52] U.S. Cl. ........................................ 55/181; 55/390
[58] Field of Search ................. 55/34, 60, 61, 79, 181, 55/208, 390

[56] References Cited

U.S. PATENT DOCUMENTS

| 2,545,850 | 3/1951 | Imhoff .................................. 5/79 X |
| 2,630,877 | 3/1953 | Berg ...................................... 55/79 X |
| 2,684,124 | 7/1954 | Hines, Jr. ............................... 55/79 X |
| 2,684,731 | 7/1954 | Starr, Jr. et al. ...................... 55/79 X |
| 2,723,000 | 11/1955 | Fritz et al. ............................ 55/79 X |
| 2,780,526 | 2/1957 | Fleck .................................. 55/390 X |
| 3,520,112 | 7/1970 | Mittelstrass et al. ............... 55/390 X |

FOREIGN PATENT DOCUMENTS

| 552060 | 11/1956 | Belgium ........................................ 55/79 |
| 52-14580 | 4/1977 | Japan . | |
| 666715 | 2/1952 | United Kingdom ........................ 55/59 |

Primary Examiner—Robert H. Spitzer
Attorney, Agent, or Firm—Wegner & Bretschneider

[57] ABSTRACT

An apparatus for the continuous recovery of organic or inorganic solvent from a waste gas containing the solvent, which comprises an adsorption unit for causing the solvent present in the waste gas to be adsorbed on an activated carbon and a regeneration unit for simultaneously effecting the recovery of the adsorbed solvent and the regeneration of the activated carbon, characterized in that a moisture-desorption unit is interposed between the two units mentioned above, whereby the water content of the recovered solvent is kept down below 1%.

4 Claims, 1 Drawing Figure

APPARATUS FOR CONTINUOUS RECOVERY OF SOLVENT

This invention relates to an apparatus in which cleaned is a waste gas emanating such as from a plant and containing considerable amounts of solvent and water and, at the same time, the solvent is recovered from the waste gas in a state containing substantially no water.

Japanese Patent Laid-Open Publication No. 14580/1977 discloses an apparatus for the continuous recovery of a solvent from such waste gas by use of an activated carbon.

This published apparatus comprises a waste gas adsorption unit for causing an organic or inorganic solvent contained in the waste gas such as from a plant to be adsorbed on a solid adsorbent such as an activated carbon, a regeneration gas adsorption unit for causing the residual solvent present in the regeneration gas emanating from a below-mentioned activated carbon-regeneration unit to be adsorbed on the activated carbon and forwarding the spent activated carbon to the activated carbon-regeneration unit, and the activated carbon regeneration-unit for regenerating the spent adsorbent by using a non-condensable gas and, at the same time, recovering the solvent.

The apparatus provides highly efficient cleansing of the waste gas and permits very easy recovery of the solvent from the waste gas. It, nevertheless, has the disadvantage that the water present in the waste gas is directly entrained in the recovered solvent because the water and the solvent contained in the waste gas are adsorbed at the same time in the waste gas adsorption unit.

When this apparatus is to be used for recovering a solvent of high hydrophilicity such as an alcohol, for example, the recovered alcohol commonly contains more than 10% of water. Even in the recovery of an ester or ketone which has poor compatibility with water, it is difficult for this apparatus to repress the water content of the recovered solvent constantly below 1%.

In the above-mentioned particular apparatus, in order to repress successfully the water content of the recovered solvent, an incorporation of a supplementary device such as for preparatory adjustment of the moisture content in the waste gas or for dehydration of the recovered solvent is indispensable. Such incorporation inevitably entails an increase in the cost and complexity of operation.

The present invention aims to provide a novel apparatus which is capable of not merely cleansing a waste gas but also recovering from the waste gas a solvent having a very low water content without involving any complicate operation.

According to the present invention, there is provided with an apparatus for the continuous recovery of a solvent from a waste gas containing the solvent, which comprises: a first adsorption unit (waste gas adsorption unit) for bringing the incoming waste gas into fluidized contact with an activated carbon and thereby allowing the solvent contained in the waste gas to be adsorbed on the activated carbon and causing the waste gas thus treated to be discharged as a cleaned gas out of the apparatus, a water-desorption unit for causing the spent activated carbon issuing from the waste gas adsorption unit to be brought into counterflow contact with a non-condensable gas and thereby allowing the water present in the spent activated carbon to be desorbed from the activated carbon, guiding the non-condensable gas entraining the desorbed water into a water-condensing separator and thereby allowing the water to be removed in the form of condensate from the gas therein, and forwarding the resultant water-free non-condensable gas through a circulation path back into the water-desorption unit for reuse therein, a second adsorption unit (regeneration gas adsorption unit) for causing the activated carbon issuing the water-desorption unit to be brought into counterflow contact with a regeneration gas issuing from a regeneration gas condenser and thereby allowing the solvent still present in the regeneration gas to be adsorbed on the activated carbon, and an activated carbon-regeneration unit for causing the activated carbon issuing from the regeneration gas adsorption unit to be brought into counterflow contact with the non-condensable regeneration gas undergone the treatment in the regeneration gas adsorption unit and subsequently introduced through the circulation path into the activated carbon-regeneration unit and thereby allowing the solvent present in the activated carbon to be desorbed from the activated carbon and, at the same time, the activated carbon to be regenerated, guiding the regeneration gas entraining the desorbed solvent into the regeneration gas condenser and thereby separating the solvent and, in the meantime, supplying the regenerated activated carbon to the waste gas adsorption unit for reuse therein.

The apparatus of the present invention represents an improvement in the apparatus for the continuous recovery of a solvent which is disclosed in Japanese Patent Laid-Open Publication No. 14580/1977, the improvement comprising incorporation of a water-desorption unit into the apparatus of the prior invention between the waste gas adsorption unit and the regeneration gas adsorption unit.

In the water-desorption unit of the apparatus of this invention, the water component is substantially exclusively desorbed from the activated carbon which has adsorbed the water in conjunction with the solvent in the preceding waste gas adsorption unit. This particular function is based on the fact that an adsorption isotherm of water to the activated carbon is specific as compared with that of any ordinary solvent and the amount of adsorbed water is particularly small at temperatures higher than 70°–80° C.

From the activated carbon containing both the water and the solvent, only the water can be practically exclusively desorbed without simultaneously causing the desorption of the solvent by maintaining the temperature of the water-desorption unit at a proper level and using a non-condensable gas such as nitrogen as the water-desorption gas. The water-desorption gas now entraining the desorbed water departs from the water-desorption unit, proceeds to a water condenser and subsequently circulates from the water condenser back into the water-desorption unit. The water condenser inserted in the circulation path is maintained at a temperature at which only the water is condensed and the solvent desorbed in a very small amount in conjunction with the water from the activated carbon is not condensed.

In the process for recovery of a solvent by means of an activated carbon, this invention permits the water content in the recovered solvent to be repressed constantly below 1% without impairing the advantage of the process and without necessitating incorporation of a supplementary device for complicate control of humidity in the waste gas under treatment. Thus, the apparatus can be operated stably through the four seasons of the year. It may well be called a simple solvent recovery system, simple from the standpoint of both operation and equipment.

Now, one preferred embodient of the apparatus of this invention will be described with reference to the accompanying drawing.

FIG. 1 is an explanatory diagram showing the preferred embodiment of the apparatus of the invention.

In the apparatus for the continuous recovery of a solvent illustrated in FIG. 1, a waste gas adsorption (first adsorption unit) unit I, a water-desorption unit II, a regeneration gas adsorption unit (second adsorption unit) III and an activated carbon-regeneration unit IV are disposed in a descending order. The units, I through IV, mentioned above are pierced by vertical, slender cylindrical paths 5, 14 and 16. These cylindrical paths are adapted so that the adsorbent particles (activated carbon), which are caused to fill up and flow down the paths, function as a material seal capable of impeding flow of gas between the adjacent units. The waste gas adsorption unit I which forms the uppermost section of the whole tower of the apparatus is provided with a plurality of perforated plates 2 to give rise to as many fluidized beds therein. The solvent-containing waste gas subjected to the treatment by this apparatus is introduced through a nozzle 4, allowed to flow upwardly and come into contact with the activated carbon supported on the perforated plates and finally discharged out of the apparatus via a discharge nozzle 31. The activated carbon is supplied through a feed line 30 onto the uppermost perforated plate, fluidized and, in the fluidized form, allowed to contact with the incoming waste gas and adsorb the solvent and the water from the waste gas. With the progress of the adsorption, the activated carbon flows down to the successively lower perforated plates. After departure from the lowermost perforated plate, it passes through the seal portion 5 and flows into the water-desorption unit II.

The water-desorption unit II is provided therein with a shell and tube heat exchanger. In this water-desorption unit II, the activated carbon is indirectly heated with steam or some other suitable heat medium introduced through a nozzle 7 and, at the same time, it is subjected to desorption of water inside the cylindrical path 6 by means of a non-condensable gas blown in through an inlet nozzle 12. The heat medium leaves water-desorption unit II through outlet 8. The non-condensable gas which is introduced for the purpose of the desorption contains water of a partial pressure corresponding to the dew point which is equivalent to the humidity within the condenser 10. The concentration of the solvent contained in the non-condensable gas can be estimated on the basis of the adsorption isotherm which is determinable by the amount of the solvent adsorbed on the activated carbon flowing into the water-desorption unit II and the temperature in the cylindrical path 6. By properly setting the temperature within this cylindrical path 6, therefore, the concentration of the solvent in the non-condensable gas can be controlled so that the solvent will not condensate at the temperature within the condenser 10. Generally, the temperature within the cylindrical path 6 is controlled so that the non-condensable gas discharged through the nozzle 9 contains the solvent at a concentration at which the solvent has a dew point about 10° C. lower than the temperature within the condenser 10. Consequently, only the water is allowed to condensate within the condenser 10, while the solvent which is still entrained by the non-condensable gas without being condensed therein. This gas may be circulated for reuse. In this case, the temperature within the condenser 10 and that within the cylndrical path 6 are selected from the adsorption isotherm vs. humidity graph in due consideration of the kind of solvent used, the affinity of solvent for water, the amount of solvent adsorbed by the activated carbon, etc. so that the water content in the activated carbon flowing down from the water-desorption unit II is minimized.

The activated carbon from which the adsorbed water has been substantially removed in the water-desorption unit II is passed through the sealed portion 14 and then allowed to flow down into the regeneration gas adsoption unit III. The regeneration gas adsorption unit III is provided therein with a moving-bed adsorption device formed of a plurality of vertical, cylindrical paths 15. The non-condensable regeneration gas containing the residual solvent which has escaped from being condensed in a condenser 20 is introduced through the inlet nozzle 21 into the unit. The activated carbon which flows down the vertical cylindrical paths in the form of moving bed and the incoming regeneration gas are brought into mutual counterflow contact, during which contact the greater part of the residual solvent in the regeneration gas is adsorbed on the activated carbon and removed from the gas. Through the discharge nozzle 22 diposed in the upper chamber of the unit III, the regeneration gas is discharged so as to be forwarded to the activated carbon-regeneration unit IV.

Subsequently, the activated carbon is allowed to flow down into the activated carbon-regeneration unit IV via the cylindrical path 16 now serving as the gas seal. Since the pressure of the gas flowing out of the activated carbon-regeneration unit IV into the condenser 20 is higher than the pressure of the gas flowing into the regeneration gas adsorption unit III, this vertical cylindrical path 16 is required to have a relatively slender cavity so as to manifest the effect of gas seal to a sufficient extent.

Similarly to the water-desorption unit II, the activated carbon-regeneration unit IV which is situated in the lowermost section of the whole tower of the apparatus is provided with a plurality of vertical cylindrical paths 25 adapted to pass the activated carbon particles in the form of moving bed. It is further provided with a vertical shell and tube heat exchanger adapted to effect indirect application of heat from a proper heat medium to the activated carbon flowing down the interior of the unit in the form of moving bed. The heat medium is introduced through inlet 17 and leaves through outlet 18.

The non-condensable regeneration gas discharged from the regeneration gas adsorption unit III is introduced via the inlet nozzle 24 into the activated carbon-regeneration unit IV by means of a blower 23 and then allowed to flow up the vertical cylindrical paths 25. During the upward flow, the gas entrains the solvent desorbed from the activated carbon. This gas is discharged from the discharge nozzle 19 and forwarded to the regeneration gas condenser 20. In the condenser 20, the solvent is condensed and separated and then recovered in the solvent recovery tank 32. At this time, the amount of the inseparable solvent proportionate to the solvent's vapor pressure which relies upon the temperature of condensation remains in the regeneration gas.

For removal of the residual solvent, the gas is forwarded to the regeneration gas adsorption unit III. In this unit III, the solvent is again adsorbed on the activated carbon. The gas consequently regenerated and cleaned is introduced by the blower 23 into the activated carbon-regeneration unit IV. Thus, a circulation path is laid between the regeneration gas adsorption unit III and the activated carbon-regeneration unit IV, making it possible to have the regenerating gas cyclically used without break.

While the activated carbon is flowing down the vertical cylindrical paths 25 in the form of moving bed, it is heated to the temperature at which the solvent adsorbed on the activated carbon during its downward flow through the two upper adsorption units I and III undergoes desorption. The desorbed solvent is entrained by the desorption gas flowing up the cylindrical paths 25 and then carried away. The activated carbon which has been regenerated in consequence of the desorption of water is discharged through the outlet nozzle 26 provided at the base of the apparatus 1 and allowed to flow into the pneumatic conveyor 27, wherein the activated carbon is forwarded through the transfer tube 29, the speed reducer 3 and the activated carbon feed line 30 into the adsorption unit by the current of air injected via the air injection nozzle 28.

Example

In an apparatus of FIG. 1 air of 30° C. of temperature and 30% of relative humidity and containing 1500 ppm of isopropyl alcohol (hereinafter referred to as IPA) was treated at a flow rate of 600 Nm$^3$/H. The conditions and results of the treatment were as shown below.

When particles of activated carbon (having an average particle diameter 600μ) were circulated at a rate of 15 kg/H and the temperature of the waste gas adsorption unit I was fixed at 30° C., the cleaned gas discharged through the tower head 31 contained IPA at a concentration of about 80 ppm.

When the interior temperature of the water-desorption unit II was kept at 100° C. by steam heating and the amount of nitrogen gas circulated through the blower 11 of the water-desorption unit was fixed at 1.5 Nm$^3$/H, the gas discharged through the nozzle 9 was found to contain about 8% of IPA and 0.17 kg of water per kg of nitrogen. When the temperature of the outlet gas from the condenser 10 was controlled at 40° C., the IPA concentration was about 8% and the water content was 0.048 kg per kg of nitrogen. The amount of water which was condensed was about 0.24 kg/H. This fact indicates that within the condenser, the water alone underwent condensation and the IPM underwent no condensation.

The interior temperature of the activated carbon-regeneration unit IV was fixed at 150° C., the circulation of nitrogen was carried out at a rate of 3 Nm$^3$/H and the temperature of the outlet gas from the condenser 20 was lowered and kept at 10° C. with cooling water. At this time, the gas issuing from the condenser contained about 2.3% of IPA. The amount of IPA condensed was 2.1 kg/H and that of water was 0.015 kg/H. Thus, the water content in the recovered solvent was found by calculation to be 0.7%. The initial goal of the present invention, namely the recovery of the solvent containing not more than 1% of water, was thus accomplished.

In the case of an apparatus which excluded the water-desorption unit II, the water content in the recovered solvent was about 10% because the water condensed at the rate of 0.24 kg/H in the condenser was entrained by the solvent.

What is claimed is:

1. An apparatus for the continuous recovery of a solvent from a waste gas containing the solvent, which comprises:

a first adsorption unit including means for bringing waste gas into fluidized contact with activated carbon disposed within said first adsorption unit to permit solvent in said waste gas to be adsorbed on said activated carbon and means for discharging the remainder of said waste gas from said apparatus;

a water-desorption unit connected to said first adsorption unit to receive said activated carbon from said first adsorption unit;

a water condenser-separator;

first gas circulating means connecting said water condenser-separator to said water-desorption unit for circulating a non-condensable gas between said water-desorption unit and said water-condenser separator, said first gas circulating means being so arranged as to effect counterflow contact between said non-condensable gas and said activated carbon received by said water-desorption unit from said first absorption unit, whereby water desorbed from said activated carbon received by said water-desorption unit is entrained and removed by said non-condensable gas to said water condenser-separator to condense said water, the resultant water-free non-condensable gas being recirculated to said water-desorption unit;

a second adsorption unit connected to said water-desorption unit to receive said water-desorbed activated carbon from said water-desorption unit;

an activated carbon regeneration unit connected to said second adsorption unit to receive water-desorbed activated carbon from said second adsorption unit;

a regeneration gas condenser;

first gas transfer means connecting said second adsorption unit to said regeneration gas condenser whereby regenerating gas may be transferred from said regeneration gas condenser to said second adsorption unit; second gas transfer means connecting said activated carbon regenerated unit to said regeneration gas condenser, whereby regeneration gas may be transferred to said condenser from said activated carbon regeneration unit, said first gas transfer means being so arranged as to bring said regenerating gas into counterflow contact with said water-desorbed activated carbon received by said second adsorption unit from said water-desorption unit;

second gas circulating means connecting said second adsorption unit and said activated carbon unit for transferring said regenerating gas which has passed through said second adsorption unit to said activated carbon regeneration unit, said second gas circulation means being so arranged as to effect counterflow contact between said regenerating gas which has passed through said second absorption unit and said water-desorbed activated carbon received by said activated carbon regeneration unit from said second adsorption unit, whereby said solvent is desorbed from said activated carbon and entrained in said regenerating gas;

said second gas transfer means being so located as to effect transport of said generating gas with said entrained desorbed solvent to said regeneration gas condenser whereby substantially all of said entrained desorbed solvent is condensed, the remaining regenerating gas with any remaining solvent being recirculated through said first gas transfer means to said second adsorption unit, whereby said remaining solvent is adsorbed on said water-desorbed activated carbon received by said second adsorption unit from said water-desorption unit.

2. The apparatus according to claim 1, wherein the first adsorption unit, the water-desorption unit, the second adsorption unit and the activated carbon-regeneration unit are connected in a vertical arrangement to permit gravity feed of said activated carbon from unit to unit.

3. The apparatus according to claim 2, wherein said units are connected by means including vertical cylindrical paths adapted to permit downward passage therethrough of activated carbon particles packed to a particle density enough to offer resistance to gas passage so as to prevent the gas received in one unit from flowing into another unit.

4. The apparatus according to any of claims 1 to 3, wherein the water-desorption unit and the activated carbon-regeneration unit are each provided with a vertical shell and tube heat exchanger.

* * * * *